(12) United States Patent
Kang et al.

(10) Patent No.: US 8,355,612 B2
(45) Date of Patent: Jan. 15, 2013

(54) ACTIVE ALIGNMENT METHOD FOR MULTI-CHANNEL OPTICAL TRANSMITTER AND RECEIVER, WHICH HAS AN OPTICAL SIGNAL GENERATOR WITH AN OPTICAL MULTIPLEXER, WHICH HAS AN OPTICAL SIGNAL GENERATOR WITH AN OPTICAL MULTIPLEXER

(75) Inventors: Sae Kyoung Kang, Daejeon (KR); Joon Ki Lee, Daejeon (KR); Jyung Chan Lee, Daejeon (KR); Kwang Joon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 651 days.

(21) Appl. No.: 12/543,852

(22) Filed: Aug. 19, 2009

(65) Prior Publication Data

US 2010/0290739 A1 Nov. 18, 2010

(30) Foreign Application Priority Data

May 18, 2009 (KR) .................. 10-2009-0043197

(51) Int. Cl.
*G02B 6/42* (2006.01)
*H04J 14/02* (2006.01)
(52) U.S. Cl. .................................. 385/52; 398/82
(58) Field of Classification Search ............ 385/39, 385/52, 14, 15, 16, 24, 88, 89, 92, 147; 398/82, 398/135, 79
See application file for complete search history.

(56) References Cited

U.S. PATENT DOCUMENTS

| | | | | |
|---|---|---|---|---|
| 5,214,728 A * | 5/1993 | Shigematsu et al. | ............. | 385/24 |
| 6,748,172 B2 * | 6/2004 | Lyu | ............... | 398/79 |
| 6,955,483 B2 * | 10/2005 | Narayan | .................. | 385/94 |
| 7,184,621 B1 * | 2/2007 | Zhu | ...................... | 385/24 |
| 7,203,422 B2 * | 4/2007 | Kani et al. | ........................ | 398/72 |
| 7,218,806 B2 | 5/2007 | Han et al. | | |
| 7,327,771 B2 * | 2/2008 | Kim et al. | ..................... | 372/64 |
| 7,596,315 B2 * | 9/2009 | Nakashima et al. | ............. | 398/34 |
| 2006/0088255 A1 | 4/2006 | Wu et al. | | |
| 2007/0122154 A1 | 5/2007 | Nakanishi et al. | | |
| 2007/0233906 A1* | 10/2007 | Tatum et al. | .................... | 710/26 |

FOREIGN PATENT DOCUMENTS

| | | |
|---|---|---|
| KR | 1999-0048161 | 7/1999 |
| KR | 10-0583651 | 5/2006 |
| KR | 10-2006-0135902 | 12/2006 |
| KR | 10-2007-0087922 | 8/2007 |
| KR | 10-2008-0111560 | 12/2008 |

OTHER PUBLICATIONS

Korean Office Action issued Apr. 28, 2011 in corresponding Korean Patent Application 10-2009-0043197.

\* cited by examiner

*Primary Examiner* — Akm Enayet Ullah
(74) *Attorney, Agent, or Firm* — Staas & Halsey LLP[

(57) ABSTRACT

An active alignment method for a multi-channel optical transmitter and receiver is disclosed. The active alignment method for a multi-channel optical transmitter includes actively aligning an optical signal generator with an optical multiplexer based on optical outputs of a plurality of wavelengths from the optical signal generator and an optical output of the optical multiplexer, and actively aligning the optical multiplexer with a fiber optic coupler based on an optical output of the optical multiplexer and an optical output of the fiber optic coupler.

6 Claims, 4 Drawing Sheets

ACTIVE ALIGNMENT METHOD FOR MULTI-CHANNEL OPTICAL TRANSMITTER AND RECEIVER, WHICH HAS AN OPTICAL SIGNAL GENERATOR WITH AN OPTICAL MULTIPLEXER, WHICH HAS AN OPTICAL SIGNAL GENERATOR WITH AN OPTICAL MULTIPLEXER

CROSS-REFERENCE TO RELATED APPLICATION

This application claims the benefit of Korean Application No. 10-2009-0043197, filed on May 18, 2009 in the Korean Intellectual Property Office, the disclosure of which is incorporated herein by reference.

BACKGROUND OF THE INVENTION

1. Field of the Invention

The present invention relates to an active alignment method for a multi-channel optical transmitter and receiver, and more particularly, to an active alignment method for a multi-channel optical transmitter and receiver to reduce the sizes of a Transmitter Optical Sub-Assembly (TOSA) and a Receiver Optical Sub-Assembly (ROSA) for use in a Coarse Wavelength Division Multiplexing (CWDM) or Local Area Network-Wavelength Division Multiplexing (LAN-WDM) system and increase reliability, economic effectiveness, and reproducibility.

The present invention was derived from a study conducted as one of technology development projects for Information Technology (IT) growth engines by the Ministry of Knowledge Economy and the Institute for Information Technology Advancement (the national project's name: 100 Gbps Ethernet and Optical Transmission Technology Development).

2. Description of the Related Art

Along with an increase in the amount of data transmitted over a network, a WDM optical transmission system has been substituting for a single-channel optical transmission system. WDM is a data transmission and reception scheme in which data at different wavelengths are multiplexed and transmitted/received through a single optical fiber.

For 40 G and 100 G Ethernet, standardization of a Physical Medium Dependent (PMD) sublayer using CWDM and LAN-WDM is under way. Compared to Dense WDM (DWDM), CWDM is characterized by a reduced number of data channels transmitted on a single optical fiber.

A metro access network near to a subscriber network may not require as much traffic as a core network. Over the metro access network, a CWDM optical network system is widely used instead of a DWDM optical network system that suffers from a narrow gap between data channels, complex implementation, and high cost.

Due to a smaller number of multiplexable wavelengths and a larger gap between data channels than in DWDM, CWDM boasts of low implementation complexity and low design and fabrication costs.

Accordingly, low-price uncooled light sources are usually used in a CWDM optical network system, and Electro-absorption Modulation Lasers (EMLs) in a LAN-WDM optical network system.

The Institute of Electrical and Electronics Engineers (IEEE) 802.3ba 40 GBASE-LR4 Ethernet standard defines four wavelengths (1271 nm, 1291 nm, 1311 nm and 1331 nm), a data rate of 10.3125 Gb/s for each channel, and a 20-nm channel gap, for CWDM.

According to the IEEE 802.3ba 100 GBASE-LR4 Ethernet standard, four wavelengths (1295 nm, 1300 nm, 1305 nm and 1310 nm), a data rate of 25.78125 Gb/s for each channel, and a 5-nm channel gap are defined for LAN-WDM.

CWDM and LAN-WDM each require a TOSA for multiplexing data channels and transmitting them on a single optical fiber and a ROSA for demultiplexing a multiplexed optical signal into individual optical signals. The TOSA is provided with light sources having four different wavelengths. To multiplex data channels emitted from these light sources onto a single optical fiber, the TOSA requires a fiber optic coupler, an optical Multiplexer (MUX), and an optical signal generator.

The optical signal generator converts electrical signals of data channels to optical signals. The optical MUX multiplexes the optical signals received from the optical signal generator to a single optical signal. The fiber optic coupler, which is physically connected to an optical fiber, transmits the multiplexed optical signal.

The fiber optic coupler, the optical MUX, and the optical signal generator are in passive or active alignment to one another in order to minimize the loss of light generated from the optical signal generator. The passive alignment scheme is to align the fiber optic coupler, the optical MUX, and the optical signal generator fixedly at predetermined positions of a substrate. The active alignment scheme is to align the fiber optic coupler, the optical multiplexer, and the optical signal generator according to a predetermined beam pattern by use of an additional alignment device or a laser welding device, or manually, taking into account light intensity, distances among the fiber optic coupler, the optical multiplexer, and the optical signal generator, and positions that maximize the optical power of an optical signal.

Despite the advantages of simple alignment and packaging of the fiber optic coupler, the optical MUX, and the optical signal generator, the passive alignment scheme has low accuracy and low reliability. On the other hand, the active alignment scheme increases time and cost because optical power and a beam pattern are to be adjusted for the respective components.

Many methods have been considered to implement a TOSA and a ROSA for CWDM and LAN-WDM systems. A method for performing an optical multiplexing function using beam splitters is disclosed in U.S. Pat. No. 7,184,621 (hereinafter, referred to as reference 1). In reference 1, four light sources, three beam splitters, an isolator, and a collimator are provided and the light sources are distributed according to the positions of the beam splitters.

However, a TOSA is difficult to miniaturize and packaging cost increases due to optical alignment in reference 1.

U.S. Pat. No. 7,218,806 (hereinafter, referred to as reference 2) discloses an optical transceiver using an optical waveguide and a thin-film filter on a platform configured with a Planar Lightwave Circuit (PLC). The optical transceiver of reference 2 may contribute to miniaturization of a TOSA and a ROSA. However, the optical transceiver also increases the cost of optical alignment packaging of a light source, an optical detector, and an optical waveguide and decreases product reproducibility. The optical transceiver is not favorable in terms of mass production.

SUMMARY OF THE INVENTION

In accordance with an aspect of the present invention, there is provided an active alignment method for a multi-channel optical transmitter, including actively aligning an optical signal generator with an optical multiplexer based on optical outputs of a plurality of wavelengths from the optical signal generator and an optical output of the optical multiplexer, and actively aligning the optical multiplexer with a fiber optic coupler based on an optical output of the optical multiplexer and an optical output of the fiber optic coupler.

In accordance with another aspect of the present invention, there is provided an active alignment method for a multi-channel optical receiver, including actively aligning a fiber optic coupler with a demultiplexer based on an optical output applied to the fiber optic coupler and an optical output of the demultiplexer, and actively aligning the demultiplexer with an opto-electric converter based on an optical output of the actively aligned demultiplexer and an optical output of the opto-electric converter.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

The above and other objects, features and other advantages of the present invention will be more clearly understood from the following detailed description taken in conjunction with the accompanying drawings. Reference will now be made in detail to the preferred embodiments of the present invention, examples of which are illustrated in the accompanying drawings. Wherever possible, the same reference numbers will be used throughout the drawings to refer to the same or like parts.

Figure 1:
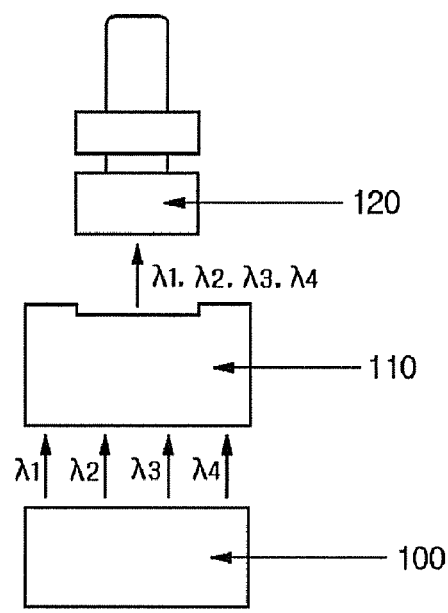
FIG. 1 schematically illustrates the structure of a TOSA according to the present invention.

FIG. 1 schematically illustrates the structure of a Transmitter Optical Sub-Assembly (TOSA) according to the present invention.

Referring to FIG. 1, the TOSA, which is applied to an optical transmitter that operates in CWDM or in LAN-WDM, includes a fiber optic coupler 120, an optical Multiplexer (MUX) 110, and a multi-channel optical signal generator 100.

The multi-channel optical signal generator 100 has laser diodes for generating four different wavelengths $\lambda 1$, $\lambda 2$, $\lambda 3$ and $\lambda 4$ and generates optical signals corresponding to electrical signals. The multi-channel optical signal generator 100 has four laser light sources, a laser driver amplifier, a power supply, and control lines built therein. The multi-channel optical signal generator 100 may or may not include the laser driver amplifier according to total power consumption.

The optical MUX 110 multiplexes the optical signals at the four wavelengths $\lambda 1$, $\lambda 2$, $\lambda 3$ and $\lambda 4$ received from the multi-channel optical signal generator 100 into a single optical signal. The four wavelengths $\lambda 1$, $\lambda 2$, $\lambda 3$ and $\lambda 4$ may be 1271 nm, 1291 nm, 1311nm and 1331 nm respectively for 40 G BASE-LR4 optical signal transmission, and 1295.56 nm, 1300.05 nm, 1304.58 nm, and 1309.14 nm respectively for 100 G BASE-LR4 optical signal transmission.

The fiber optic coupler 120 is configured with a lens and a metal ferrule. The fiber optic coupler 120, which is connected to an external optical fiber underground or overground, transmits the multiplexed optical signal received from the optical MUX 110 on the optical fiber. The fiber optic coupler 120 is connected to the external optical fiber in an LC receptacle or SC receptacle, or by pig-tailing.

Neighboring portions of the fiber optic coupler 120 and the optical MUX 110 and neighboring portions of the optical MUX 110 and the multi-channel signal generator 100 are formed of a metal and are laser-welded later so as to combine the fiber optic coupler 120, the optical MUX 110, and the multi-channel signal generator 100 with one another.

FIGS. 2 to 5 illustrate an active alignment method for the TOSA illustrated in FIG. 1.

Figure 2:
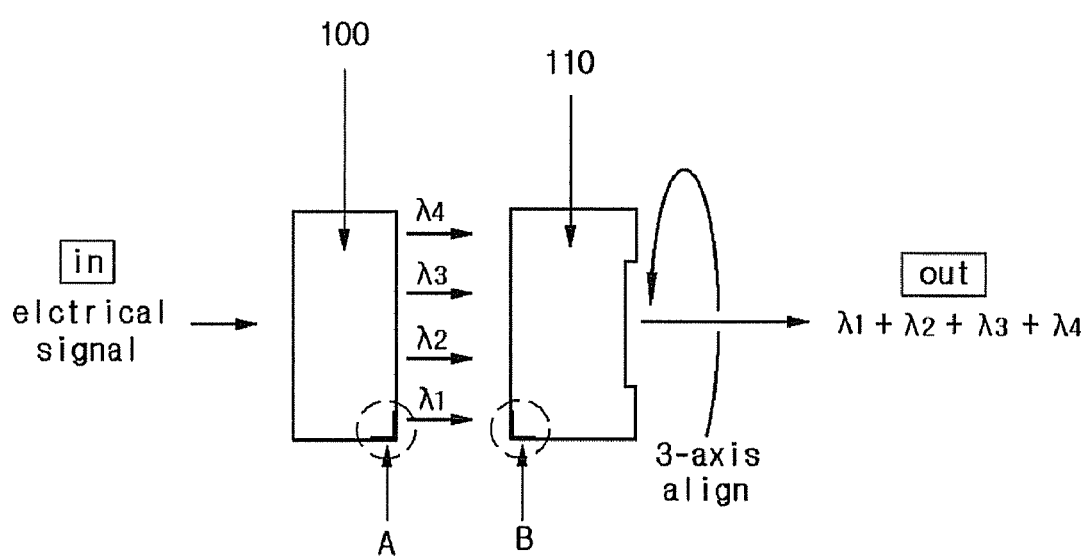
FIGS. 2 to 5 illustrate an active alignment method for the TOSA illustrated in FIG. 1.

Referring to FIG. 2, the multi-channel optical signal generator 100 is actively aligned with the optical MUX 110 along three axes by a laser welding device or a device for aligning a TOSA or a ROSA, which will collectively be referred to as an alignment device. The three axes are x, y and z axes.

The alignment device determines whether the active alignment is successful, referring to the sum of optical outputs corresponding to the four wavelengths $\lambda 1$, $\lambda 2$, $\lambda 3$ and $\lambda 4$ that are generated for the input of electrical signals (in) to the multi-channel optical signal generator 100 and a multiplexed optical output (out) from the optical multiplexer 110. If the sum of optical outputs corresponding to the four wavelengths $\lambda 1$, $\lambda 2$, $\lambda 3$ and $\lambda 4$ is much less than the multiplexed optical output (out), the optical alignment should be carried out again.

A portion A of the multi-channel optical signal generator 100 and a portion B of the optical MUX 110 are formed of a metal. The metal portions A and B are laser-welded by the alignment device (i.e. a laser welding device) so as to combine the multi-channel optical signal generator 100 with the optical MUX 110.

Figure 3:
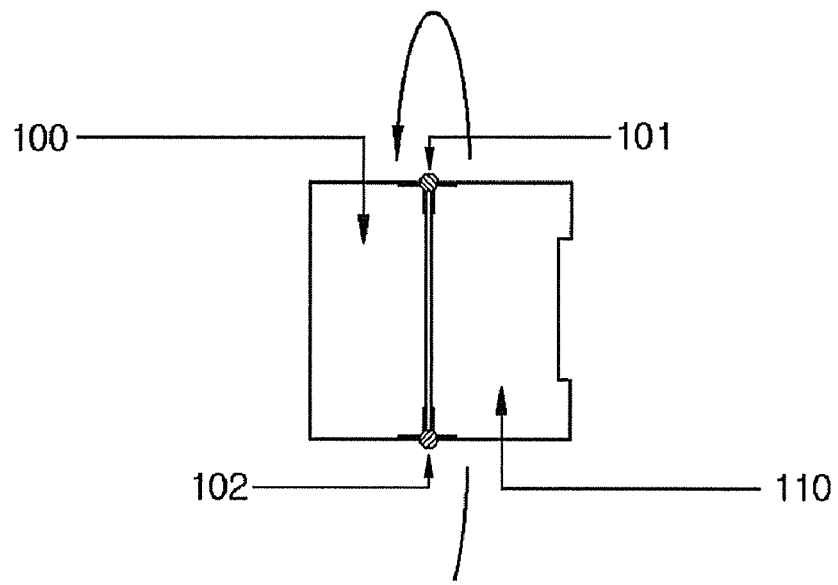

FIG. 3 illustrates an example of laser-welding of the 3-axis aligned multi-channel signal generator 100 and optical MUX 110.

Referring to FIG. 3, the multi-channel signal generator 100 is tightly combined with the optical MUX 110 by laser-welding of portions 101 and 102.

Figure 4:
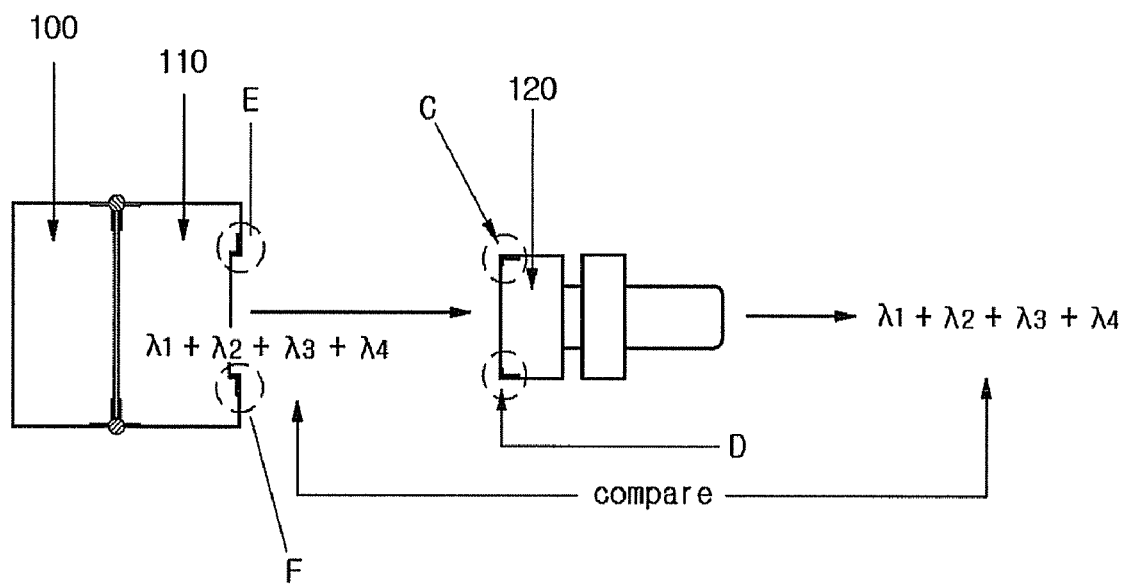

Referring to FIG. 4, after combining the multi-channel signal generator 100 and the optical MUX 110, the alignment device determines whether the multi-channel signal generator 100 and the optical MUX 110 have been aligned, referring to the optical output of the optical MUX 110 and the optical output of the multi-channel optical signal generator 100. When two optical outputs are most approximate, the alignment device determines that the multi-channel signal generator 100 and the optical MUX 110 have been aligned.

In accordance with the present invention, an active alignment is also performed between the fiber optic coupler 120 and the optical MUX 110.

A 3-axis active alignment is carried out for all of the fiber optic coupler 120, the optical MUX 110, and the multi-channel optical signal generator 100 by combining the optical MUX 110 with the multi-channel optical signal generator 100 by laser welding and comparing the optical output of the combined optical multiplexer 110 with that of the fiber optic coupler 120.

Figure 5:
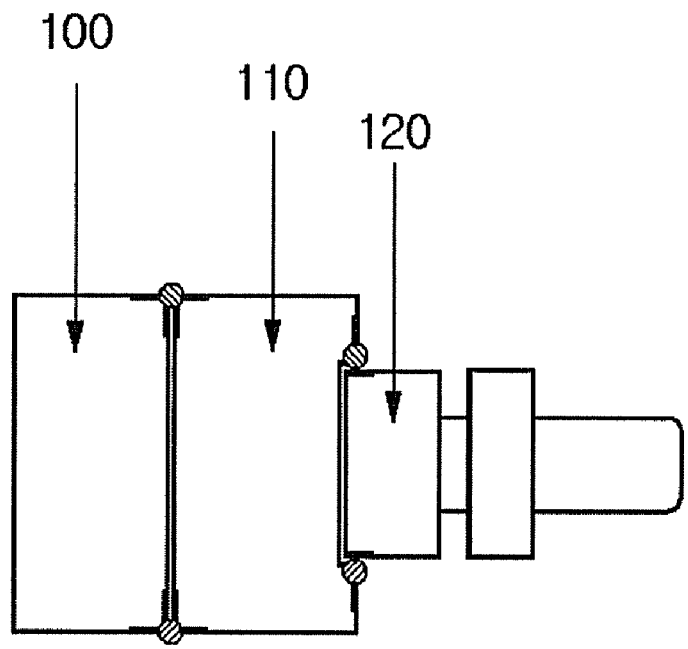

FIG. 5 illustrates an example of the multi-channel optical signal generator 100, the optical MUX 110, and the fiber optic coupler 120 in combination.

Referring to FIG. 5, the TOSA is configured for application to CWDM or LAN-WDM by tightly combining the multi-channel optical signal generator 100 with the optical MUX 110 through laser-welding of their metal portions and also tightly combining the optical MUX 110 with the fiber optic coupler 120 through laser-welding of their neighboring portions. In the present invention, when the TOSA is formed, the components 100, 110 and 120 are stacked sequentially by active alignment and then laser-welded.

Each time one component is stacked on another component, active alignment is performed by comparing the optical output of the underlying component with that of the mounted component. The optical MUX 110 and the multi-channel optical signal generator 100 may be aligned by rotation.

Figure 6:
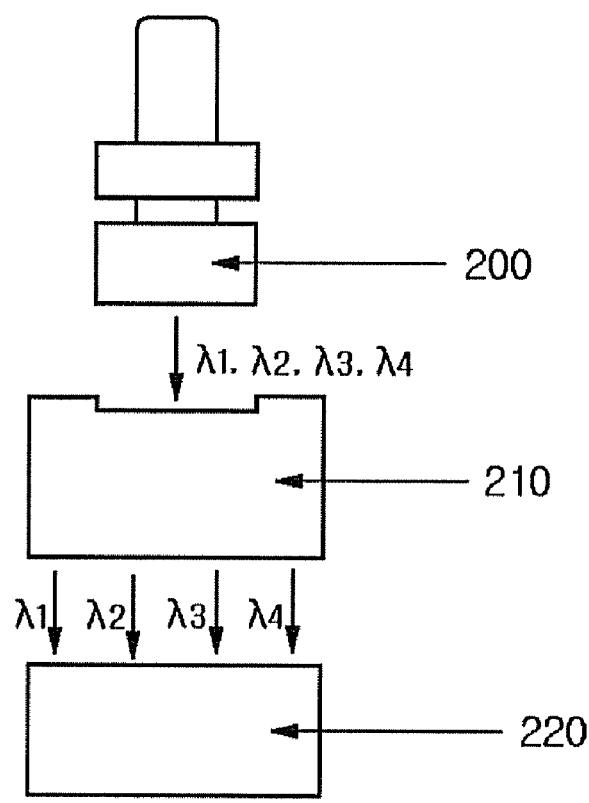
FIG. 6 conceptually illustrates the structure of a ROSA.

FIG. 6 conceptually illustrates the structure of a ROSA.

Referring to FIG. 6, the ROSA includes a fiber optic coupler 200, a Demultiplexer (DEMUX) 210, and an opto-electric converter 220. The fiber optic coupler 200, the DEMUX 210, and the opto-electric converter 220 of the ROSA are similar in configuration to the fiber optic coupler 120, the optical MUX 110, and the multi-channel optical signal generator 100 of the TOSA illustrated in FIG. 1.

The function of the ROSA is an inverse version of the function of the TOSA that transmits an optical signal on an external optical fiber. The ROSA receives an optical signal through the external optical fiber at the fiber optic coupler 200, demultiplexes the optical signal at the demultiplexer 210, and converts the demultiplexed optical signals to electrical signals at the opto-electric converter 220.

Figure 7:
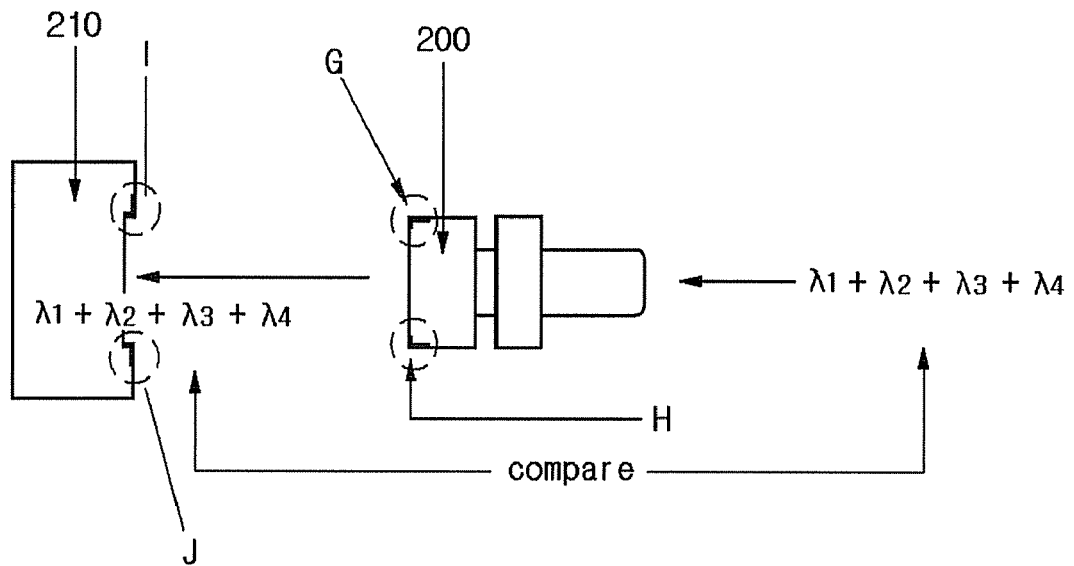
FIGS. 7 and 8 illustrate an active alignment method for the ROSA.
Figure 8:
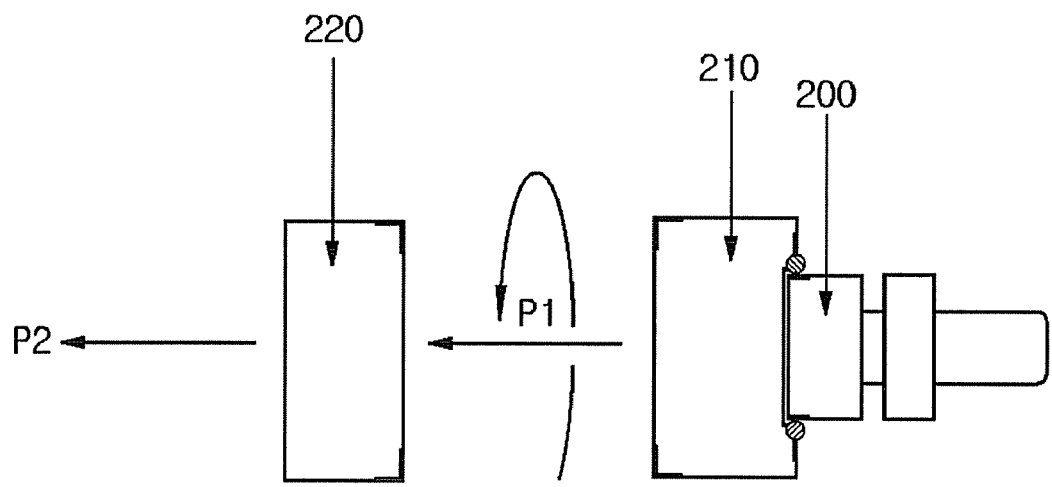

FIGS. 7 and 8 illustrate an active alignment method for the ROSA.

Referring to FIG. 7, the fiber optic coupler 200 is aligned with the DEMUX 210 along three axes. The arrangement device compares the optical outputs of optical signals at the four wavelengths $\lambda 1, \lambda 2, \lambda 3$ and $\lambda 4$ received at the fiber optic coupler 200 or the optical outputs of test optical signals with wavelengths similar to the four wavelengths $\lambda 1, \lambda 2, \lambda 3$ and $\lambda 4$ with the optical outputs of optical signals from the DEMUX 210. If the optical outputs of the fiber optic coupler 200 are similar to those of the DEMUX 210, the alignment device determines that the active alignment is successful. Then, the fiber optic coupler 200 and the DEMUX 210 are laser-welded.

FIG. 8 illustrates active alignment between the opto-electric converter 220 and the laser-welded fiber optic coupler 200 and DEMUX 210.

After the fiber optic coupler 200 and the DEMUX 210 are in active alignment and laser-welded, the alignment device compares the optical output of optical signals from the laser-welded DEMUX 210 with the magnitude of electrical signals from the opto-electric converter 220.

The alignment device may have a look-up table listing optical outputs of the demultiplexer 210 mapped to magnitudes of electrical signals from the opto-electric converter 220. Thus, the alignment device may determine whether the welded DEMUX 210 has been aligned with the opto-electric converter 220, referring to the look-up table that lists the magnitudes of electrical signals corresponding to optical output values from the demultiplexer 210

As is apparent from the above description, the present invention facilitates packaging of a TOSA and a ROSA, increases the reliability of the packaged TOSA and ROSA, and increases the reproducibility of packaging and reliability in CWDM and LAN-WDM optical transmission and reception systems.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An active alignment method for a multi-channel optical transmitter, comprising:
   actively aligning an optical signal generator with an optical multiplexer based on optical outputs of a plurality of wavelengths from the optical signal generator and an optical output of the optical multiplexer;
   actively aligning the optical multiplexer with a fiber optic coupler based on an optical output of the optical multiplexer and an optical output of the fiber optic coupler, and
   combining, by laser-welding, neighboring portions of the optical signal generator and the optical multiplexer after actively aligning the optical signal generator with the optical multiplexer.

2. The active alignment method according to claim 1, further comprising combining, by laser-welding, neighboring portions of the optical multiplexer and the fiber optic coupler after actively aligning the optical multiplexer with the fiber optic coupler.

3. The active alignment method according to claim 1, wherein the fiber optic coupler, the optical multiplexer and the optical signal generator are applied to one of a CWDM optical transmission system and a LAN-WDM optical transmission system.

4. An active alignment method for a multi-channel optical receiver, comprising:
   actively aligning a fiber optic coupler with a demultiplexer based on an optical output applied to the fiber optic coupler and an optical output of the demultiplexer;
   actively aligning the demultiplexer with an opto-electric converter based on an optical output of the actively aligned demultiplexer and an optical output of the opto-electric converter,
   detecting an optical output of an optical signal applied to the fiber optic coupler;
   calculating the sum of optical outputs of optical signals having a plurality of wavelengths output from the demultiplexer; and
   comparing the sum of optical outputs with the optical output of the optical signal applied to the fiber optic coupler to determine a alignment.

5. The active alignment method according to claim 4, wherein the active alignment between the demultiplexer and the opto-electric converter comprises determining whether the demultiplexer has been actively aligned with the opto-electric converter, referring to a look-up table having sums of optical outputs of optical signals having the plurality of wavelengths with respect to magnitudes of electrical signals output from the opto-electric converter.

6. The active alignment method according to claim 4, wherein the fiber optic coupler, the demultiplexer and the opto-electric coupler are applied to one of a CWDM optical transmission system and a LAN-WDM optical transmission system.

* * * * *